3,256,346
PREPARATION OF ALKYLATED BISPHENOLS
Harry E. Albert and Paul G. Haines, Lafayette Hill, Pa., assignors to Pennsalt Chemicals Corporation, Philadelphia, Pa., a corporation of Pennsylvania
No Drawing. Filed Mar. 22, 1961, Ser. No. 97,448
4 Claims. (Cl. 260—619)

This invention relates to a process improvement which enables alkylated phenols to be prepared with improved color values.

Alkylated phenols and particularly bisphenols having substituent alkyl groups are well known antioxidants useful in natural and synthetic rubbers and other polymers. These bisphenols can be made by several procedures; e.g. (1) alkylation of the phenol and subsequent condensation with an aldehyde to yield the bisphenol or (2) condensation of a phenol with the aldehyde first and then alkylation. In these procedures for making the alkylated bisphenols a final step usually involved in the process is a distillation to strip off volatile organic by-product material and/or any water which may be present. It is during this step that some thermal degradation of the alkylated bisphenol product often occurs and results in a discolored product.

Many agents are known as decolorizers and stabilizers for phenols and alkylphenol-aldehyde resins, but numerous attempts to use them to improve the color of the dark discolored product have all resulted in failure. For example, U.S. 2,752,398 discloses that the addition of a small amount of phosphoric acid to phenols (including bis-lower alkyl phenols) immediately after distillation inhibited color formation for extended periods of time. Such procedure, however, introduces acid to the alkylated phenol and causes dealkylation and degradation of the product. Also of interest is U.S. 2,365,121 which discloses that dark colored phenol-aldehyde resins may be refined to lighter colored products by bleaching them with nascent hydrogen. In this case the resin is dissolved in a suitable solvent and hydrogen generated in situ by the action of an acid reactant (e.g. hydrochloric acid, sulfuric acid, acid salts, etc.) on a metal above hydrogen in the electromotive series (e.g., cadmium, aluminum, zinc, etc.). Again such procedures are of no value in the treatment of the alkylbisphenols because of the acid conditions employed. Even if effective, the use of a solvent system is hazardous and also results in poor economics. Likewise many other additives have been suggested for decolorizing and stabilizing phenolic materials (e.g., organic acids, aluminum chloride, carbon, hydrazines, amines, and the like) but none of these agents successfully decolorizes the alkylbisphenol when added to dark product obtained by the usual preparative methods.

It has now been found that alkylated bisphenols made by the above normal procedures, but having improved color values can be obtained in accord with the process of this invention which comprises the steps of adjusting the reaction mass containing the crude alkylated bisphenol to an acid-free condition, adding from about 0.1% to about 10% based on the weight of the alkylated bisphenol of a color stabilizing reagent selected from the group consisting of zinc dust, stannous halides, alkali metal hypophosphites, alkyl, aryl and alkaryl phosphites, alkali metal hydrosulfides, phthalic anhydride and hexamethylene tetramine, and thereafter distilling the reaction mass. The significant and critical features of this process lie first in removing acid from the crude reaction mass and secondly in the addition of the decolorizing agent prior to distillation of the crude product.

As indicated, one process for preparing the bisphenol antioxidants involves alkylation and subsequent condensation with aldehydes. Preferred antioxidants prepared by such procedure involves first alkylating a phenolic material having not more than two alkyl substituents per phenol nucleus, which substituents have a total of not more than 3 carbon atoms, with an alkylating agent, preferably an olefin, containing from 3 to 12 and preferably 4 to 9 carbon atoms. The alkylation is carried out under normal alkylating conditions which produce a crude alkylate consisting of alkylated phenols containing one or more alkyl substituents of from 3 to 12 carbon atoms derived from the alkylating agent together with a proportion, which varies depending on the starting materials, of the original phenolic material which has escaped alkylation. The crude mixture of alkylated and unalkylated (i.e., containing no alkyl substituents other than methyl or ethyl) phenols, which is unsuitable itself as a rubber antioxidant because of the unalkylated phenols it contains, is then reacted with an aldehyde such as isobutyraldehyde under such conditions that the unalkylated phenols in the alkylate together with at least some of the alkylated phenols are converted to polynuclear phenols (predominantly to bisphenols) thus producing a complex mixture including alkylated mono-nuclear phenols, alkylated polynuclear (mostly bis) and unalkylated polynuclear (mostly bis) phenols.

After the aldehyde reaction any separable aqueous layer in the reaction mass is removed from the organic layer and the organic phase is freed of acid, preferably by neutralization with an alkaline salt. Any alkaline neutralizing agent may be employed such as alkaline earth and alkali metal hydroxides, carbonates, bicarbonates, the various strong amines, quaternary ammonium hydroxides, and the like. Preferably, however, an alkali metal carbonate such as sodium carbonate will be employed. The amount of neutralizing agent will be that required for complete neutralization and this may be determined by adding sufficient agent to bring the pH of an aliquot sample dispersed in water to a pH of 7.0 or higher and preferably to pH 9 to 12. The decolorizing agent is then added and the mass is distilled to strip off volatile material. The product is the still pot residue which, after filtration to remove solids, is a viscous oil having a color value significantly lower than that obtained when the steps of this invention are not practiced. Such a product mixture has been found to be nonstaining and to have high activity as an antioxidant in rubber formulations.

The above described procedure is highly advantageous in that (1) inexpensive readily available starting materials are employed, viz. cheap phenolic materials such as phenol, cresol or xylenol mixtures, and low cost aldehydes; (2) no expensive or tedious processing steps are required to separate out individual components (e.g. it becomes unnecessary to remove the unalkylated phenolic starting material); (3) high yields of end product are obtained; and (4) the resulting product is generally less staining and of higher antioxidant activity than many of the individual components of the product mixture and in addition is considerably less expensive to prepare than many of the individuals as pure compounds.

The phenolic starting material may be represented by the general formula

where $R^1$ and $R^2$ may be hydrogen or methyl or ethyl radicals and may be the same or different, the total number of carbon atoms in $R^1$ and $R^2$ combined being not greater than 3. Suitable phenolic starting materials thus include unsubstituted phenol, $C_6H_5OH$; cresols including ortho, meta and para cresols and mixtures of cresols; xylenols, including 2,3-xylenol, 2,4-xylenol, 2,5-xylenol, and 2,6-xylenol or mixtures of these. Ethyl phenols including ortho, meta and para ethyl phenol may also be employed although they are not preferred.

Phenol is a highly preferred starting material because it is inexpensive and gives highly active antioxidants. Also highly preferred are the xylenols, particularly mixtures of xylenols. Antioxidants prepared in accordance with the invention from xylenol mixtures are of especially high activity and the procedures of the invention are particularly applicable to such mixtures. Also preferred are the cresols particularly mixtures such as mixtures of meta and para cresol, or mixtures of cresols with xylenols. Such starting materials likewise lend themselves particularly well to the procedures of the invention and produce excellent antioxidants.

In general, the alkylating agent may be an olefin, an organic halide or an alcohol having from 3 to 12, and preferably from 4 to 9 carbon atoms. Olefins are the preferred alkylating agents since they are generally less expensive and more readily available than the corresponding halides or alcohols. They are likewise preferred since they produce no side product during the alkylation as do the halides (which produce hydrogen halides) and the alcohols (which produce water).

Preferred among the olefins are the alkenes such as butenes, amylenes, hexenes, heptenes, octenes and nonenes. Such olefins are available as by-products of petroleum refinery operations such as from the catalytic cracking of gas oil; by the polymerization of propylene to produce isomeric hexenes or nonenes; by the polymerization of isobutylene to produce isomeric octenes and from other similar relatively inexpensive sources. Particularly preferred are tertiary alkenes (i.e., containing a tertiary carbon atom) having from 4 to 9 carbon atoms such as isobutylene, diisobutylene (which is a mixture of the isomers 2,4,4-trimethyl-pentene-2 and 2,4,4-trimethyl-pentene-1 produced by the dimerization of isobutylene) and the olefins 2-methyl butene-1, and 2-methyl butene-2. Commercial olefin mixtures, such as mixed amylenes, mixed hexenes, mixed heptenes, mixed octenes or mixed nonenes are desirable because of their relatively low cost. Other olefins that may be employed include cycloalkenes such as cyclohexene, α-methylcyclohexene, cyclopentene, α-methylcyclopentene, 4-methylcyclohexene, etc., and aralkenes such as styrene, α-methylstyrene, 4-methylstyrene, 4-ethylstyrene, 3-chlorostyrene, 2-methylstyrene, etc.

Among the organic halides that may be employed, the chlorides and bromides, and particularly the chlorides are preferred. Suitable organic halides include alkyl halides such as tert-butyl chloride, tert-amyl chloride, mixed-amyl chlorides, mixed-hexyl chlorides, mixed-octyl chlorides, mixed-nonyl chlorides, mixed-amyl bromides, etc. and particularly tertiary alkyl halides such as tert-butyl chloride, tert-amyl chloride, chlorides produced by reaction of HCl with diisobutylene using ionic catalysts, tert-butyl bromide, tert-amyl bromide, chlorides produced by reaction of HCl with mixed nonenes using ionic catalysts, etc. Also suitable are cycloalkyl halides such as cyclohexyl chloride, cyclohexyl bromide, α-methylcyclohexyl chloride, α-methylcyclohexyl bromide, cyclopentyl chloride, etc., and aralkyl halides such as α-chloroethylbenzene, α-chloroisopropylbenzene, p-(α-chloroethyl) toluene, m-(α-chloroethyl) toluene, benzyl chloride, benzyl bromide, p-methylbenzyl chloride, p-chlorobenzyl chloride, etc.

Alcohols that may be employed as alkylating agents include alkanols such as tert-butyl alcohol, sec-butyl alcohol, pentanol-2, hexanol-3, tert-amyl alcohol, octanol-2, octanol-4, nonanol-4, etc. and particularly tertiary alkanols such as tert-butyl alcohol, tert-amyl alcohol, 1,1-dimethylbutanol, 1,1-dimethylhexanol, 1,1,3,3-tetramethylbutanol. Also suitable are cycloalkanols such as cyclohexanol α-methylcyclohexanol, cyclopentanol, α-methylcyclopentanol, 4-methylcyclohexanol, 3-methylcyclohexanol, 2-methylcyclohexanol and aralkanols such as α-methylbenzyl alcohol, benzyl alcohol, p-methylbenzyl alcohol, m-methylbenzyl alcohol, o-methylbenzyl alsohol, β-phenylethyl alcohol, etc.

Using olefin alkylating agents, the alkylation is carried out in the presence of Friedel-Crafts type catalysts, e.g., sulfuric acid, hydrochloric acid, $AlCl_3$, $ZnCl_2$, $SnCl_4$, $H_3PO_4$, $BF_3$, etc.; anhydrous reaction media; temperatures ranging from 20 to 120° C. and preferably from 20 to 80° C.; pressures ranging from atmospheric to 1000 lbs./in.$^2$ gage or more and preferably from atmospheric to 60 lbs./in.$^2$ gage; and reaction periods of from 1 to 8 hours. The molar ratio of olefin to phenolic material should generally be in the range of from 3 to 1 to 1 to 1 depending upon the potentially available alkylatable positions on the nucleus of the phenolic starting material.

When using an organic halide as the alkylating agent, similar alkylating conditions are employed, including the same Friedel-Crafts type catalysts.

Employing alcohols and alcohol as the alkylating agent, preferred reaction conditions are essentially the same except that generally more vigorous conditions are necessary due to the lesser reactivity of alcohols as alkylating agents.

The composition of the crude alkylate will depend upon the type of phenolic starting material employed. In all cases some of the original phenolic material will remain unalkylated because of the difficulty involved in carrying the alkylation to 100% completion. In the case of unsubstituted phenol, $C_6H_5OH$, since all three of the reactive positions (i.e., 2, 4 and 6) are open, using a relatively active olefin, e.g., diisobutylene, only relatively small amounts of unalkylated phenol, e.g., from 5 to 10% will generally be found in the crude alkylate. Most of the phenol will be monoalkylated, or dialkylated and in some cases small amounts of trialkylated phenol may be present. When less active olefins, such as commercial nonenes, are used the unalkylated phenol in the final product is somewhat higher.

In the case of the substituted phenols, such as cresols and xylenols the amount of unreacted phenolic starting material in the alkylate will generally be higher since alkylation at one or more of the reactive ortho and para positions is either blocked or hindered by the methyl substituents. In the case of the xylenols particularly, at least one and in many cases two of the reactive ortho and para positions is either blocked or hindered. In the case of 2,5-xylenol for example, it is difficult to obtain substantial alkylation at any of the positions and as a consequence a high proportion of this isomer usually remains unalkylated. The alkylation of 3,5-xylenol is even for difficult. Generally in the case of the commercial xylenol mixtures from 40% to 60% of the xylenol will remain unalkylated. In the case of commercial cresol mixtures, the amount of unalkylated material in the crude alkylate will be somewhat less, usually from 10 to 30% of the original cresol mixture.

Aldehydes suitable for use in the condensation reaction following the alkylation include aldehydes having from 1 to 9 carbon atoms and preferably from 2 to 5 carbon atoms, aliphatic aldehydes containing only carbon, hydrogen and oxygen being preferred. Particularly preferred aldehydes include glyoxal, acetaldehyde (or paraldehyde) propionaldehyde, n-butyraldehyde, isobutyraldehyde, n-valeraldehyde and isovaleraldehyde. Other aldehydes that may be employed include, e.g., formaldehyde, benzaldehyde, p-chlorobenzaldehyde, salicylaldehyde, chloroactaldehyde, chloral, β-chloropropionaldehyde, crotonaldehyde, acrolein, glutaraldehyde, 2-ethylhexaldehyde, chloral and aldol.

The condensation of the alkylated phenols with the aldehyde is carried out by adding the aldehyde together with a condensation catalyst to the crude alkylate without separating the unalkylated from the alkylated material. The condensation conditions should be adjusted such that the predominant product of the condensation is bisphenols with only minor amounts, e.g., 2 to 5% of higher condensation products such as tris and tetrakis phenols, and such that essentially no resinous material is produced, that is molecules containing more than about 4 phenol nuclei. Such resinous material is unsuitable in that it has little or no antioxidant activity. When a polyfunctional aldehyde is used such as glyoxal two moles of phenolic material may condense with each aldehyde group such that, e.g., four moles of phenolic may condense with one mole of glyoxal. With reference to such polyfunctional aldehydes, the term bisphenol is intended to mean condensates containing per molecule no more than two phenolic nuclei for each aldehyde group of the aldehyde. For example, a bisphenol with reference to glyoxal would mean one containing four phenolic nuclei per molecule.

Control of the condensation reaction to produce predominantly bisphenols and little or no resinous material depends in large measure upon controlling the molar ratio of aldehyde to phenolic material capable of undergoing the condensation reaction (in general, this includes any phenolic material having an available ortho or para position with respect to the hydroxyl group). Usually, the molar ratio of monofunctional aldehyde to condensable phenolic material should be of the order of 0.5, this being the stoichiometric ratio to produce bisphenols, although some departure from this ratio, e.g., ratios of from about 0.3 to about 1.5 may be used. The criticality of the aldehyde to phenol ratio will vary depending on the aldehyde employed and the degree to which the phenolic material is substituted with alkyl groups thus blocking potentially reactive positions. If formaldehyde is used, care must be exercised since formaldehyde is very reactive relative to other aldehydes and readily tends to form resinous materials. The more substituted the phenolic material the less critical is the aldehyde:phenol ratio, or the other condensation conditions, since there are fewer reactive positions on the phenol to react with the aldehyde. Thus, an alkylated xylenol having at least three out of its five possible positions blocked by alkyl groups is much less likely to form resinous higher condensates than an alkylated phenol having, e.g., only one or two of its five possible positions blocked. With such highly alkylated materials accordingly an excess of aldehyde may be used without the formation of resinous products. Some excess of aldehyde over the theoretical amount to form bisphenols is often desirable to assure complete conversion of condensable phenols particularly since some of the aldehyde may be consumed by side reactions such as aldehyde condensing with itself.

Reaction temperature for the condensation reaction will usually be between 20° C. and 100° C. Lower temperatures, e.g., 20° C. to 40° C. are favored for formaldehyde because of the reactivity of this aldehyde, while with less reactive aldehydes such as propionaldehyde and isobutyraldehyde, reaction temperatures of from 40° C. to 80° C. are generally preferred.

The condensation reaction is preferably carried out in the presence of an acidic type catalyst such as the acidic type catalyst already present from the alkylation step or may be an acid added at the time of the aldehyde reaction step. Sulfuric, phosphoric or acetic acids are to be preferred.

It is preferred in most cases to carry out the condensation reaction in the presence of the same catalyst that has served as the alkylation catalyst in the previous alkylation reaction. Following this procedure, to effect the condensation, it is merely necessary to add the aldehyde to the crude alkylate and, if required, additional catalyst of the same type as employed in the alkylation. It is generally unnecessary prior to the condensation reaction, to remove excess olefin present in the crude alkylate from the alkylation reaction since this can be stripped off, together with other volatiles, following the condensation.

Reaction time is not critical, and usually is of the order of from 1 to 5 hours.

The final product, even in the case where unsubstituted phenol is used as a starting material, is a complex mixture. In the case of phenol, the product will consist for the most part of alkylated bisphenols with small amounts of higher nonresinous condensation products such as tris and tetrakis phenols and in some cases small amounts of trialkylated phenol which because all the active positions are blocked cannot condense with the aldehyde. The proportion, however, of this latter component is ordinarily very small. The bisphenols are alkylated in varying degrees, that is monoalkylated or dialkylated, and furthermore may be symmetrical or unsymmetrical. That is, one nucleus may be monoalkylated while the other is dialkylated. Small amounts, e.g., 5% to 10% of partially or completely unalkylated bisphenols are also present due to the presence of some unalkylated phenol in the crude alkylate.

With substituted phenols such as cresols and xylenols, the mixtures are even more complex. The alkylation will block all of the reactive positions of a portion of the phenolic material. Such alkylated cresols or xylenols cannot undergo condensation and thus are found in the final product as alkylated cresols or xylenols rather than as bisphenols. Likewise, since the alkylation does not proceed as nearly to completion, there will be a greater proportion of partially or completely unalkylated bisphenols in the final product. Likewise, because of the various isomeric forms of the cresols and xylenols, the number of possible isomeric bisphenols is greatly increased.

In the alternate process for preparing the antioxidants, the same general reagents and conditions are employed except that the order of reactions is reversed. Thus, the phenolic body is first condensed with the aldehyde to form a bisphenol and then alkylation of the bisphenol is carried out. It will be understood, however, that in this technique, the water formed by the condensation reaction of aldehyde and phenol will be removed prior to the alkylation step. This may be done by a conventional vacuum or other distillation techniques. There is an advantage to this procedure of alkylating the bisphenol in that the linkage between the phenolic nuclei is predominantly in the para position and thus the alkyl groups introduced by the alkylation step go predominantly into positions ortho to the phenolic hydroxyl. This configuration has been shown to have somewhat higher antioxidant activity and a somewhat lower tendency toward discoloration.

It will be understood that the products of the first reaction of the phenolic material with the aldehyde or the alkylating material may be recovered and need not immediately be subjected to the second step for obtaining the antioxidant product. Thus, the process to which this invention is applicable includes the alkylation of pure bisphenols as well as the condensation of pure alkylated phenols with aldehydes.

In practicing this invention, the operable decolorants which may be incorporated in the antioxidant product after adjusting to an acid-free condition prior to distillation will be selected from the group of zinc dust, stannous halides, alkali metal hypophosphites, alkyl, aryl and alkaryl phosphites, alkali metal hydrosulfites, hexamethylenetetramine, and phthalic anhydride. Surprisingly, out of many agents studied and evaluated only these materials are effective in significantly reducing the color of the product. Furthermore, the operable agents are of no value when used (a) during the reaction (i.e., during alkylation or condensation) or (b) after distillation of the crude product.

The decolorizing agents are all readily available materials. Zinc dust, phthalic anhydride and hexamethylenetetramine require no further comment. The stannous halides include stannous chloride, stannous bromide, stannous fluoride, etc., with stannous chloride being preferred. The alkyl, aryl and alkaryl phosphites will include those alkyl, aryl and alkaryl phosphites which contain in each alkyl, aryl or alkaryl radical from one to eighteen carbon atoms. Such compounds will be the primary, secondary and tertiary derivatives of phosphorous acid and will include ethyl phosphite, diethyl phosphite, tri-n-propyl phosphite, methyl n-butyl phosphite, didodecyl phosphite, tridecyl phosphite, diethyl octodecyl phosphite, triphenyl phosphite, tri(nonylphenyl) phosphite, triisooctyl phospite, etc. The alkali-metal hydrosulfites ($M_2S_2O_4$) will include the lithium, sodium, potassium and other alkali metal salts (e.g., $Na_2S_2O_4$, $K_2S_2O_4$, etc.) with $Na_2S_2O_4$ being preferred. The alkali-metal hypophosphites include the lithium, sodium, potassium and like salts of hypophosphorous acid ($H_3PO_2$) and $NaH_2PO_2$ is the preferred species. It will be understood that each of the above classes may differ in their efficiency with respect to the particular alkylated bisphenol with which they are used. Thus, for example, zinc is most effective when used with the antioxidant obtained by octylating a phenol isobutyraldehyde condensate while the stannous halides appear most effective with those antioxidants obtained from octylated xylenols.

As indicated the amount of additive will vary from about 0.1% by weight of the alkylated bisphenol which is the lower limit for significant effectiveness, to about 10% which is a practical upper limit. Usually between about 1% and 5% will be employed.

The distillation step after the addition of the decolorizing agent is conventional being preferably a steam or vacuum distillation at atmospheric or reduced pressure as required to strip volatile materials present, leaving the product as residue.

In order to further describe and illustrate the invention the following examples are given.

*Example 1*

A mixture of 376 g. of phenol, 144 g. isobutyraldehyde, 24.2 g. of 86% phosphoric acid catalyst was stirred at 60° to 70° C. for 2 hours at the end of which time 896 g. of diisobutylene was added. The mixture was stirred and refluxed through an azeotrope water collecting system (Dean-Stark trap) to collect 39 g. of water in 3¼ hours. After cooling, 22.6 g. of concentrated sulfuric acid was added as alkylation catalyst and the mixture held at 60° to 70° C. with stirring. After cooling the reaction mixture was divided into several portions.

To one 703 g. portion was added 20 g. of anhydrous sodium carbonate to neutralize all acid (pH of aqueous solution of aliquot was about 11.5). Then 3.5 g. of sodium hypophosphite (about 1% on weight of product) was added and stirred. Then the mass was steam distilled at 150° C. to a still pot residue of 621.5 g. The residue was dried by application of vacuum and then filtered free of inorganic salts to give 584 g. of viscous oil product having a Gardner color value of 5. (A Gardner color value of 1 is water white.) A control sample which was treated in similar fashion except that no decolorizer was added had a color value of about 18. A difference in two points on the Gardner Color Scale is considered significant.

*Example 2*

A 584 g. portion of the product of Example 1 was neutralized with 17 g. of anhydrous sodium carbonate and treated with 5.9 g. of zinc dust (about 1% of product). After steam distillation at 150° C. to a pot residue of 546.5 g. it was dried and filtered to obtain 493 g. of product having a Gardner color value of 4.

*Example 3*

Following the essential details of Example 1, 892 g. of a cresylic acid mixture (B.P. 203° to 207° C.) consisting of 45% to 47% m-cresol, 22% to 24% p-cresol, 3% to 6% o-cresol, and 24% to 28% 2,4- and 2,5-xylenols and 44.8 g. of concentrated sulfuric acid was reacted by the slow addition of 1120 g. of mixed amylenes over a two-hour period at 35° to 45° C. The reaction mixture was then further reacted with 408 g. of 30% glyoxal solution at 35° to 45° C. for 2 hours. The aqueous layer was discarded and the organic layer was neutralized with 35 g. of sodium carbonate and filtered. To the filtrate was added 16 g. of sodium carbonate to ensure neutralization of all acid and various decolorizing agents added to aliquot samples which were subsequently steam distilled at 135° to 140° C. Table I indicates the additives used and the color values obtained for the dried product residue.

TABLE I

| Agent added 1% on weight of product: | Gardner color value |
|---|---|
| None | Above 18 |
| Stannous chloride dihydrate | 14 |
| Triisooctyl phosphite | 14 |

*Example 4*

Diisobutylene (2688 g.) was added to a mixture of 1128 g. phenol and 51. g. concentrated sulfuric acid during 30 minutes at 65° to 75° C. The mixture was then stirred at this temperature for 1.5 hours and then 562 g. of isobutyraldehyde was added and the mixture stirred further for two hours while being held at 65° to 75° C. The mixture was neutralized by adding anhydrous sodium carbonate and portions removed for evaluation. Table II lists the agents used and the results obtained.

TABLE II

| Agent added 1% on weight of product: | Gardner color value |
|---|---|
| None | 15 |
| Zinc dust | 11 |
| Stannous chloride dihydrate | 11 |
| Phthalic anhydride | 11 |

*Example 5*

Following the procedure of Example 4 octylated cresols and acetaldehyde were reacted and the product neutralized. Samples were evaluated with the following results:

TABLE III

| Agent added 1% on weight of product: | Gardner color value |
|---|---|
| None | 18 |
| Stannous chloride dihydrate | 12 |
| Diethylhydrogen phosphite | 15 |
| Sodium hydrosulfite | 16 |

*Example 6*

Example 1 was repeated except that the decolorizing additive was tri-(nonylphenyl)phosphite. The Gardner color value for the treated product was 14 whereas the value for a comparative untreated sample was above 18.

*Example 7*

Instead of using sodium hypophosphite in Example 1, 1% by weight of the product of hexamethylenetetramine improved the Gardner color value from 18 to 15.

*Example 8*

Following the procedure of Example 4, the antioxidant product was prepared, but no decolorizing agent was added. After stripping the volatiles present the product was red-brown in color. Tests were made on 30 g. samples of the dark product by adding 0.3 g. of the following agents and heating at 100° C. for 1.5 hours with occasional stirring:

(1) Antimony oxide
(2) Sodium hypophosphite
(3) Sodium sulfide
(4) Sodium bisulfide
(5) Sulfur (6) Stannous chloride (0.2 g.) plus sodium carbonate (0.1 g.)
(7) 2-Mercaptobenzothiazole
(8) Sodium hydrosulfite
(9) Sodium thiosulfate
(10) "Darco" decolorizing charcoal With none of the above agents was there any reduction in color of the product. Since agents 2, 6 and 8 are operable in the process of this invention it is clear that addition of the agent prior to the distillation step is essential to the process of the invention.

*Example 9*

As in Example 8, the antioxidant product was prepared without a decolorizing agent added. Then, 25 g. samples of the dark colored product were made alkaline by adding 1.5 g. water and 0.8 g. of sodium carbonate. Then 0.5 g. of sodium hypophosphite monohydrate was added to one sample and 0.5 g. of zinc dust to a second. The samples were held at 100° C. for six hours, but at no time was there any decolorizing action on the antioxidant.

*Example 10*

Disodium hydrogen phosphate is disclosed as a decolorizer for alkylated phenols in U.S. 2,727,928. However, when this material was used prior to distilling the product made in Example 4 no decolorizing effects were obtained, the product being very dark and having a Gardner color value above 18.

Likewise sodium thiosulfate, a known decolorizing agent, was evaluated and found ineffective.

It is clear from Examples 8 and 9 above that the process of this invention depends upon introduction of the specific decolorizing agents prior to the distillation step. Furthermore, Example 10 illustrates the specificity of the agents used in this invention. In view of the importance of the alkylated bisphenols as rubber antioxidants it is clear that this invention is a valuable contribution to the art.

It will be understood that many changes and variations may be made from the above description and examples without departing from the spirit and scope of the invention.

We claim:

1. In the process of preparing alkylated bisphenols by process steps including aldehyde condensation and alkylation of phenols, said phenols having the formula.

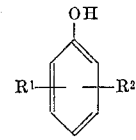

wherein $R^1$ and $R^2$ are members of the group consisting of hydrogen, methyl and ethyl radicals with the proviso that the total number of carbon atoms in $R^1$ and $R^2$ be not greater than 3, said aldehyde condensation being made to occur with an aldehyde containing from 1 to 9 carbon atoms, and said alkylation being made to occur with an alkylating agent containing between 3 and 12 carbon atoms, the improvement of adjusting the reaction mass containing the crude alkylated bisphenol to an acid free condition, adding zinc in an amount from about 0.1 to about 10% by weight of said alkylated bisphenol and thereafter distilling the reaction mass to obtain as a product residue said alkylated bisphenol product having an improved color value.

2. The process of claim 1 were the phenol is alkylated and then condensed with said aldehyde.

3. The process of claim 1 wherein the phenol is first condensed with said aldehyde and then alkylated.

4. The process of claim 1 wherein phenol is condensed with isobutyraldehyde and the bisphenol alkylated with diisobutylene.

References Cited by the Examiner

UNITED STATES PATENTS

| 2,727,928 | 12/1955 | Menn et al. | 260—621 |
| 2,734,088 | 2/1956 | Knowles et al. | 260—519 |
| 2,752,398 | 6/1956 | Riley | 260—619 |
| 2,806,068 | 9/1957 | Abrahams | 260—619 |

OTHER REFERENCES

Connett, "J. Chem. Soc." (1962), pp. 5301–2.

LEON ZITVER, *Primary Examiner.*

CHARLES B. PARKER, *Examiner.*

G. P. D'ANGELO, M. B. ROBERTO, J. E. EVANS, *Assistant Examiners.*